(12) United States Patent
Qu et al.

(10) Patent No.: US 12,098,924 B2
(45) Date of Patent: Sep. 24, 2024

(54) FUNCTION CONTROL METHOD, FUNCTION CONTROL APPARATUS, AND STORAGE MEDIUM

(71) Applicant: BEIJING XIAOMI MOBILE SOFTWARE CO., LTD., Beijing (CN)

(72) Inventors: Jinping Qu, Beijing (CN); Juejia Zhou, Beijing (CN); Dian Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 486 days.

(21) Appl. No.: 17/382,337

(22) Filed: Jul. 21, 2021

(65) Prior Publication Data
US 2022/0228870 A1    Jul. 21, 2022

(30) Foreign Application Priority Data
Jan. 15, 2021    (CN) .......................... 202110057893.3

(51) Int. Cl.
| | | |
|---|---|---|
| G01C 21/20 | (2006.01) | |
| G01C 21/00 | (2006.01) | |
| H04W 4/02 | (2018.01) | |
| H04W 4/029 | (2018.01) | |
| H04W 4/33 | (2018.01) | |
| H04W 4/38 | (2018.01) | |

(52) U.S. Cl.
CPC ......... *G01C 21/206* (2013.01); *G01C 21/005* (2013.01); *H04W 4/027* (2013.01); *H04W 4/029* (2018.02); *H04W 4/33* (2018.02); *H04W 4/38* (2018.02)

(58) Field of Classification Search
CPC ... G01C 21/206; G01C 21/005; H04W 4/027; H04W 4/029; H04W 4/33; H04W 4/38; G06F 9/542; G06F 16/29; G06V 10/751; G06V 20/20; G16Y 10/75; G16Y 20/10; G16Y 40/10; G16Y 40/20; G16Y 40/35; G16Y 40/60
See application file for complete search history.

(56) References Cited

U.S. PATENT DOCUMENTS

| | | | |
|---|---|---|---|
| 9,140,555 B1 * | 9/2015 | Andersson | ............ H04W 4/024 |
| 10,524,225 B1 * | 12/2019 | Boross | .................. G01S 5/0295 |

(Continued)

FOREIGN PATENT DOCUMENTS

| | | |
|---|---|---|
| CN | 110262274 A | 9/2019 |
| CN | 110866079 A | 3/2020 |
| WO | 2020131138 A1 | 6/2020 |

OTHER PUBLICATIONS

Extended European Search Report in Application No. 21188646.0, mailed on Jan. 14, 2022.

(Continued)

*Primary Examiner* — Sze-Hon Kong
(74) *Attorney, Agent, or Firm* — Syncoda LLC; Feng Ma

(57) ABSTRACT

A function control method can be applied to a first device configured with a smart space semantic map and include: determining a first location of the first device in the smart space semantic map; determining, based on the first location, a second device in the smart space semantic map, the second device having the capability of executing a first function; and performing a predetermined action, to cause the second device to execute the first function.

14 Claims, 12 Drawing Sheets

(56) References Cited

U.S. PATENT DOCUMENTS

| | | | |
|---|---|---|---|
| 10,660,062 B1* | 5/2020 | Yin | G01C 21/206 |
| 10,728,338 B2* | 7/2020 | Loeb | H04L 67/12 |
| 11,354,820 B2* | 6/2022 | Urtasun | G06V 20/56 |
| 11,494,973 B2* | 11/2022 | Boyadzhiev | G01C 21/206 |
| 11,747,475 B1* | 9/2023 | Foxlin | G01S 17/04 |
| | | | 356/5.01 |
| 2009/0232028 A1 | 9/2009 | Baalbergen et al. | |
| 2009/0325606 A1* | 12/2009 | Farris | H04L 67/51 |
| | | | 455/456.3 |
| 2013/0023284 A1* | 1/2013 | Stanger | G06Q 30/0207 |
| | | | 707/825 |
| 2015/0134690 A1* | 5/2015 | McClendon | G06F 16/29 |
| | | | 707/769 |
| 2016/0301543 A1* | 10/2016 | Minezawa | G06F 3/0482 |
| 2018/0041489 A1* | 2/2018 | Narayanan | H04W 4/80 |
| 2018/0341534 A1 | 11/2018 | Breaux et al. | |
| 2019/0043281 A1* | 2/2019 | Aman | G07C 9/215 |
| 2019/0202062 A1 | 7/2019 | Park et al. | |
| 2020/0260403 A1* | 8/2020 | Raghothaman | H04W 4/02 |
| 2020/0400443 A1* | 12/2020 | Pazhayampallil | G06F 16/2379 |
| 2021/0085145 A1* | 3/2021 | Kim | G05B 13/027 |
| 2022/0076019 A1* | 3/2022 | Moulon | G05D 1/0238 |

OTHER PUBLICATIONS

CN office action in application No. 202110057893.3, mailed on Oct. 27, 2023.

* cited by examiner

FUNCTION CONTROL METHOD, FUNCTION CONTROL APPARATUS, AND STORAGE MEDIUM

CROSS-REFERENCE TO RELATED APPLICATION

This application claims priority to Chinese Patent Application No. 202110057893.3 filed on Jan. 15, 2021, the disclosure of which is hereby incorporated by reference in its entirety.

BACKGROUND

With the development of technologies, Internet of Things (IoT) can realize interconnections and intercommunications among multiple devices.

SUMMARY

The present disclosure relates generally to the field of function control, and more specifically to a function control method, a function control apparatus, and a storage medium.

According to a first aspect of the embodiments of the present disclosure, there is provided a function control method, including:
determining a first location of the first device in the smart space semantic map;
determining, based on the first location, a second device in the smart space semantic map, the second device having the capability of executing a first function; and performing a predetermined action, to cause the second device to execute the first function.

According to the second aspect of the embodiments of the present disclosure, there is provided a function control apparatus, including:
a processor;
a memory device configured to store processor-executable instructions;
wherein the processor is configured to invoke the instructions to execute the function control method according to the first aspect of the present disclosure or according to any implementation modes of the first aspect thereof.

According to a third aspect of the embodiments of the present disclosure, a non-transitory computer-readable storage medium is provided, when the instructions in the storage medium are executed by a processor of a mobile terminal, enabling the mobile terminal to implement the function control method according to the first aspect of the present disclosure or according to any implementation modes of the first aspect thereof.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Figure 1:
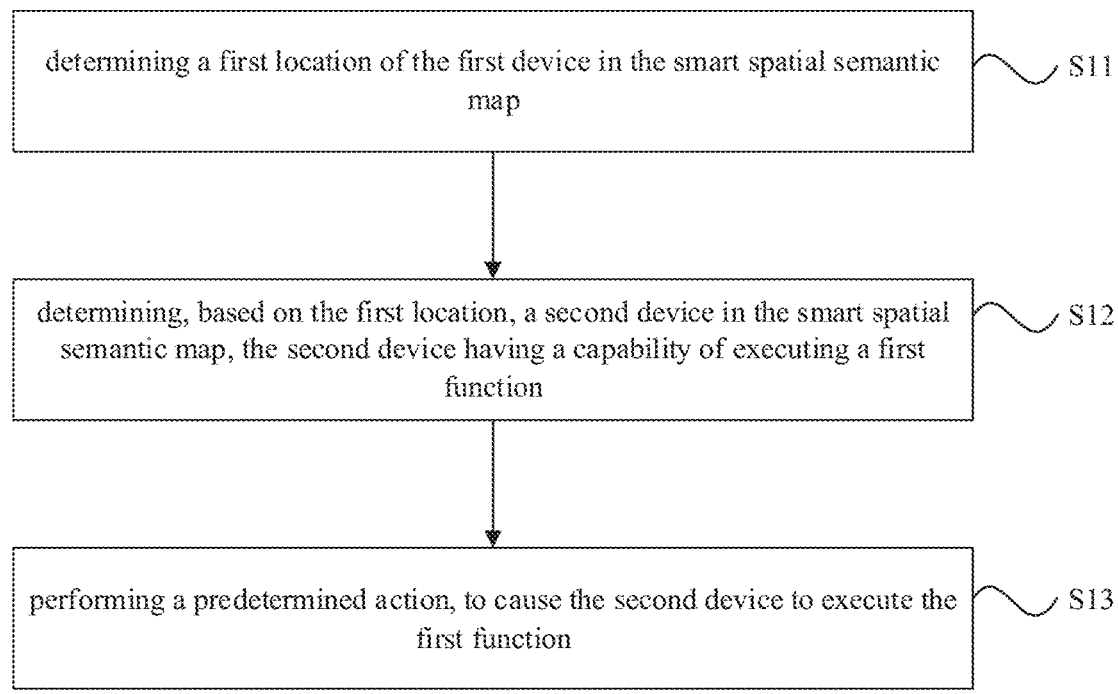
FIG. 1 is a flowchart showing a function control method according to some embodiment.

Description will now be made in detail to embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the present disclosure. Instead, they are merely examples of devices and methods consistent with aspects related to the present disclosure as detailed in the appended claims.

In a process of realizing interconnection and intercommunication of devices, users are often required to manually operate to control functions among devices.

Various embodiments of the present disclosure can realize smart interconnections and intercommunications among various devices.

A function control method provided by some embodiments of the present disclosure can be applied to interactive control scenarios between IoT devices. The IoT devices can be smart terminals or smart home devices.

In the function control method provided by some embodiments of the present disclosure, the smart space semantic map may be a pre-established map, in which specific locations of all devices in a predetermined space (for example, a house with multiple rooms) and location relationship between different devices can be set.

In the function control method provided by some embodiments of the present disclosure, the device that performs function control and interaction may be configured with a smart space semantic map. It can be understood that specific locations of all devices in a predetermined space (for example, a house with multiple rooms) and location relationship between different devices are set in the smart space semantic map. Taking the predetermined space being a house with multiple rooms as an example, location information of any device can be obtained through the map, where the location information may include rooms, locations in the rooms, and so on. In the map, the location of any device can be used to determine the location of other devices based on the location relationship between different devices.

In a function control method provided by some embodiments of the present disclosure, the location of a device is determined through the smart space semantic map, the device executing the corresponding function is determined in the smart space semantic map by determining the location of the device, so as to control the device to execute the corresponding function.

In some embodiments of the present disclosure, for the convenience of description, the device that performs function control over other devices is called the first device, the device that executes the corresponding function is called the second device, and the function that the second device is triggered to execute is called the first function, and the location of the first device in the smart space semantic map is called the first location.

FIG. 1 is a flowchart showing a function control method according to some embodiments, and as shown in FIG. 1, the function control method can be applied to a first device and includes the following steps.

In step S11, a first location of the first device in the smart space semantic map is determined.

In some embodiments of the present disclosure, the first device is configured with a smart space semantic map, so the first location can be understood as the location of the first device in the smart space semantic map. The first location of the first device in the smart space semantic map may be determined by a user device based on the information included in the smart space semantic map. For example, the first device can determine the first location based on communication with other devices, or the first device can determine the first location by combining the acquired surrounding environment information with the smart space semantic map.

In step S12, a second device is determined in the smart space semantic map based on the first location, and the second device has a capability of executing a first function.

In some embodiments of the present disclosure, the smart space semantic map includes devices that need to be controlled by the first device, and thus in the embodiments of the present disclosure, the second device capable of executing the first function can be determined in the smart space semantic map. It can be understood that there may be one or more devices capable of executing the first function in the smart space semantic map.

In step S13, a predetermined action is executed, to cause the second device to execute the first function.

In some embodiments of the present disclosure, the predetermined action may be understood as an operation instruction or an operation that triggers the second device to execute the first function.

The function control method applied to the first device in some embodiments of the present disclosure determines the second device to execute function operation control based on the location of the first device in the smart space semantic map, and executes a predetermined action to cause the second device to execute the corresponding function, which can realize smart interactive control of the function control between the first device and the second device without selecting the second device on the first device by the user.

In some embodiments of the present disclosure, the function control method involved in the above-mentioned embodiments will be described below in combination with practical applications.

In some embodiments of the present disclosure, the first function executed by the second device is first described. The first function may be a function that can be executed by the first device, or a function that cannot be executed by the first device but can be executed by the second device. For example, when the first device is a mobile phone and the second device is a TV, the first function is a video playback function, and both the mobile phone and the TV can execute the video playback function. For another example, when the first device is a mobile phone and the second device is a TV, the first function is a screen projection function, the mobile phone has the function of triggering to execute screen projection but does not have the function of receiving a projection screen instruction for playback, but the TV has the function of receiving and executing a projection screen playback instruction.

The embodiments of the present disclosure do not specifically limit the first function executed when the function control is performed between the first devices and/or the second devices, for example, the first function may be one of the screen projection function, the music playback function, and the video playback function, or a combination thereof.

In some embodiments of the present disclosure, implementation process of determining the first location of the first device in the smart space semantic map will be described below.

In some embodiments of the present disclosure, to determine the first location of the first device in the semantic map of the smart space may be, on the one hand, determined in advance the first location of the first device in the smart space semantic map, prior to executing the first function in response to the first device being triggered, and may be, on the other hand, determining the first location of the first device in the smart space semantic map in response to the first device being triggered to execute the first function.

In response to the first device being triggered to execute the first function may be in response to a terminal network environment switching to trigger to execute the first function. For example, if the first device is a mobile phone, it may be that when the user enters home, the mobile phone connects to the home hotspot to trigger execution of the first function. For another example, it may also be that the user performs a functional operation on the mobile phone to trigger execution of the first function, such as triggering execution of a screen projection function or triggering a function playback of music or video, etc.

In an implementation of some embodiments of the present disclosure, determining the first location of the first device in the smart space semantic map can be obtained through visual information. The visual information can be understood as image information obtained by image acquisition by an image acquisition device such as a camera.

In one mode, the first device may pre-store image information representing different region locations in the smart space semantic map, for example, it may be multiple sample images. The image information representing different region locations in the smart space semantic map may be pre-stored in a memory device of the first device, or pre-stored in a cloud server associated with the first device. When determining the first location of the first device in the smart space semantic map, the first device can acquire a current surrounding environment image and perform feature matching with the pre-stored sample image based on the acquired image to determine the first location of the first device in the smart space semantic map.

For the convenience of description, in some embodiments of the present disclosure, the image acquired by the first device may be referred to as the first image.

Figure 2:
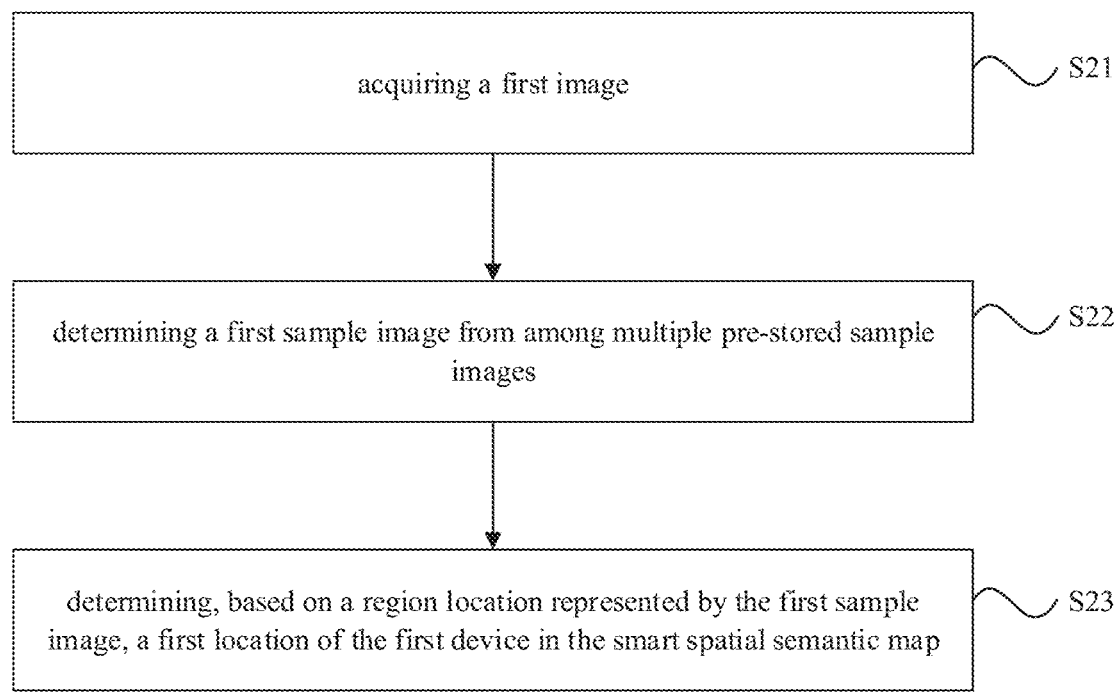
FIG. 2 is a flowchart showing a method for determining a first location of a first device in a smart space semantic map according to some embodiment.

FIG. 2 is a flowchart showing a method for determining a first location of a first device in a smart space semantic map according to some embodiments.

In step S21, a first image is acquired.

In some embodiments of the present disclosure, the first device may capture the first image by an image capture device provided in the first device itself, or may obtain the first image by other methods. For example, the mobile phone can be used as the first device, and the first image is obtained by taking a photo by any camera of the mobile phone. The first device may also obtain the first image through assisting of other devices. For example, the first device may communicate with a device having an image capture function, such as a surveillance camera in the room, to obtain the first image captured by other devices.

It can be understood that the first image acquired in some embodiments of the present disclosure is an image captured by the first device at the current location and used to match the sample image at the corresponding location in the smart space semantic map.

Figure 10:
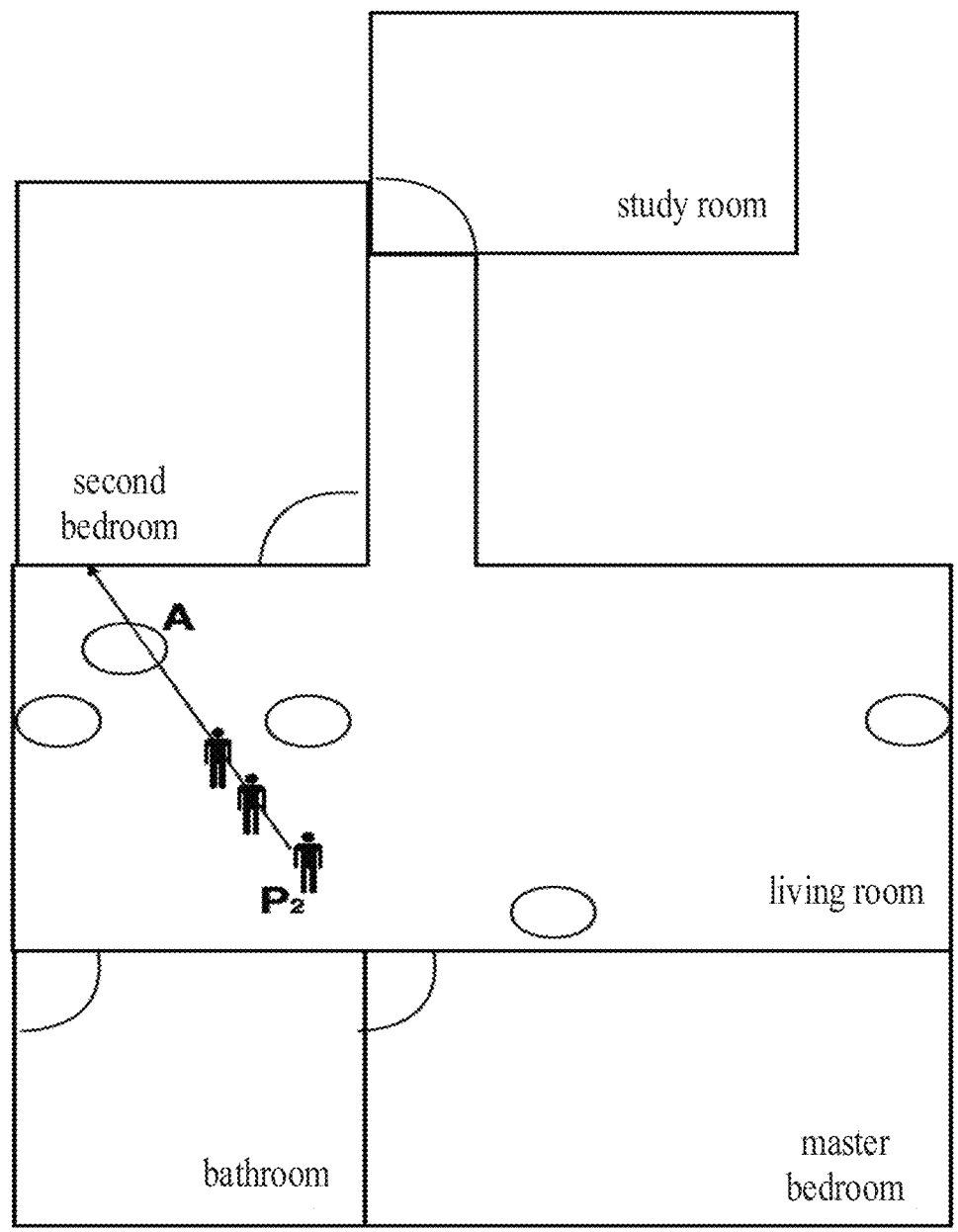
FIG. 10 is a schematic diagram showing a scenario of determining a second location in a smart space semantic map based on a movement trajectory of a first device according to some embodiments.

For example, as shown in FIG. 10, the smart space semantic map includes a living room, a bedroom (second bedroom, master bedroom), a bathroom, a study room and other rooms, and stores sample images (images of a bed, a sofa, a white wall, etc.) corresponding to the living room, the bedroom (second bedroom, master bedroom), the bathroom, the study room and other rooms. If the current location of the first device is the living room, the acquired first image should be a sample image corresponding to the living room in the smart space semantic map, such as an image of a white wall, an image of a sofa, etc.

In step S22, a first sample image is determined from multiple pre-stored sample images.

In some embodiments of the present disclosure, the first sample image may be understood as a sample image whose features in the smart space semantic map match the features of the first image. For example, if the acquired first image is an image including a sofa, the first sample image may be understood as a sofa image used to represent the living room in the smart semantic map.

In some possible implementations, pixel distribution of the first image and the sample image can be analyzed through, for example, an image feature matching algorithm, and the sample image with the highest similarity is determined as the first sample image.

In step S23, a first location of the first device in the smart space semantic map is determined based on a region location represented by the first sample image.

In some embodiments of the present disclosure, the pre-stored sample image represents a region location. For example, the region location represented by a sample image that includes image information such as white wall and bed in the bedroom is the bedroom. The region location represented by the sample image including image information such as white wall, sofa, TV, and coffee table in the living room is the living room.

After the first sample image matching the first image feature is determined in some embodiments of the present disclosure, the location of the first device in the smart space semantic map can be determined based on the region location represented by the first sample image. For example, if the acquired first image is an image including a sofa, and the matched first sample image is a sofa image representing a living room, it can be determined that the first location of the first device in the smart space semantic map is the living room.

In some embodiments of the present disclosure, the number of first sample image whose feature matches the feature of the first image may be one or more. The region location represented by the first sample image that matches the first image feature may be one or more. For example, white wall is included in regions such as the living room and bedroom. If the first sample image is an image including a white wall, then the region location represented by the first sample image includes a bedroom and a living room, in this case, it will be necessary to further determine the first location in combination with other sample images.

Figure 3:
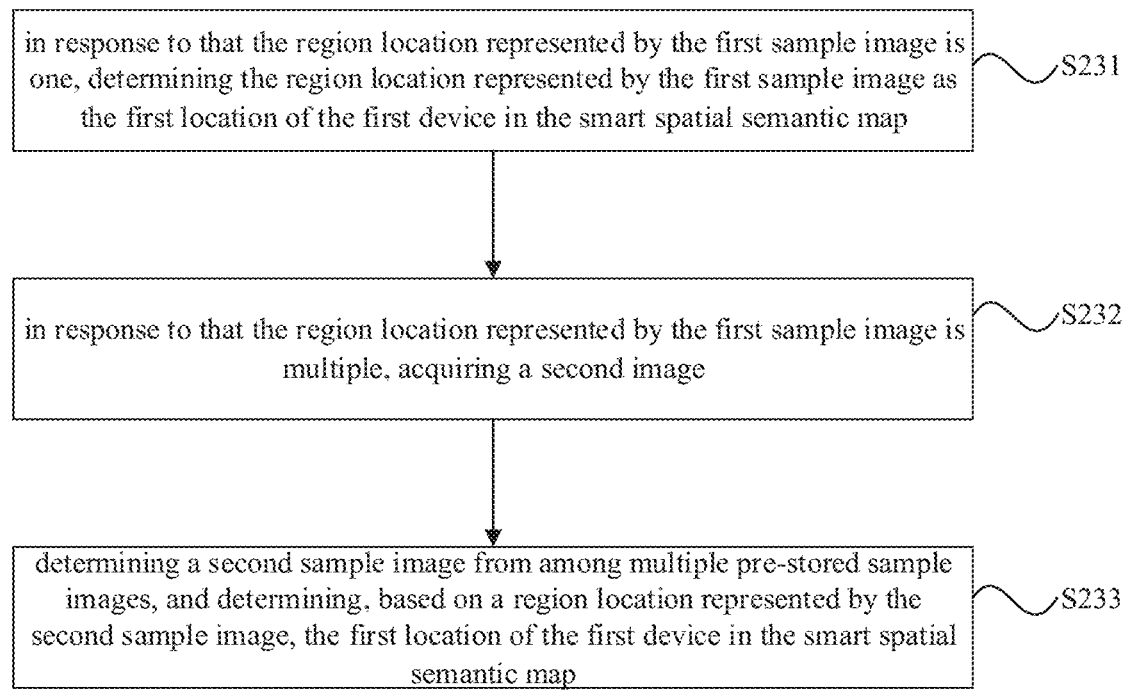
FIG. 3 is a flowchart showing another method for determining a first location of a first device in a smart space semantic map according to some embodiments.

FIG. 3 is a flowchart showing a method for determining a first location of a first device in a smart space semantic map according to some embodiments.

In step S231, in response to that the region location represented by the first sample image is one, the region location represented by the first sample image is determined as the first location of the first device in the smart space semantic map.

The region location represented by the first sample image is one, and the region location can be directly determined as the first location of the first device in the smart space semantic map.

In step S232, in response to that the region location represented by the first sample image is multiple, a second image is acquired.

When multiple region locations are represented by the first sample image, it means that the first location cannot be determined accurately from the image feature of the first image. In some embodiments of the present disclosure, in the case where there are multiple region locations represented by the first sample image, other images different from the first image can be continuously acquired, which is referred to as the second image below, and the first location is further determined based on the second image.

In step S233, a second sample image is determined from multiple pre-stored sample images, and the first location of the first device in the smart space semantic map is determined based on a region location represented by the second sample image.

The second sample image is a sample image whose image features match the features of the second image in the sample image of the smart space semantic map, and the second sample image is different from the first sample image.

In some embodiments of the present disclosure, the second image is an image that is different from the first image in terms of shooting orientation. By shooting the first image and the second image in different orientations at a shooting point, the unique region location commonly represented by the matched sample images is filtered out, as the first device's first location in the smart space semantic map. For example, the first image can be taken by the front camera of the mobile phone, and when the first location of the first device in the smart space semantic map cannot be determined from the first image, the rear camera of the mobile phone is controlled to turn on to take the second image. The first image and the second image obtained are compared with the respective sample images, and the common unique solution of the region location represented by the first image and the second image is used as the first location of the first device in the smart space semantic map.

In another implementation of some embodiments of the present disclosure, the first location of the first device in the smart space semantic map can be obtained through acoustic information and/or microwave information. The acoustic information can be understood as a sound signal sent by the first device or the user, and can also be a sound wave signal sent by the first device. According to the sound signal or sound wave signal, the first location of the first device in the smart space semantic map is determined in the manner of sound source positioning or sound wave positioning. The microwave information can be understood as a wireless signal transmitted by a router, etc., and can also be understood as a pulse positioning signal transmitted by a first device including a UWB module.

In some embodiments of the present disclosure, when the first location of the first device in the smart space semantic map is determined based on acoustic information and/or microwave information, other devices (hereinafter referred to as the third device) may assist the first device in determining the first location.

Figure 4:
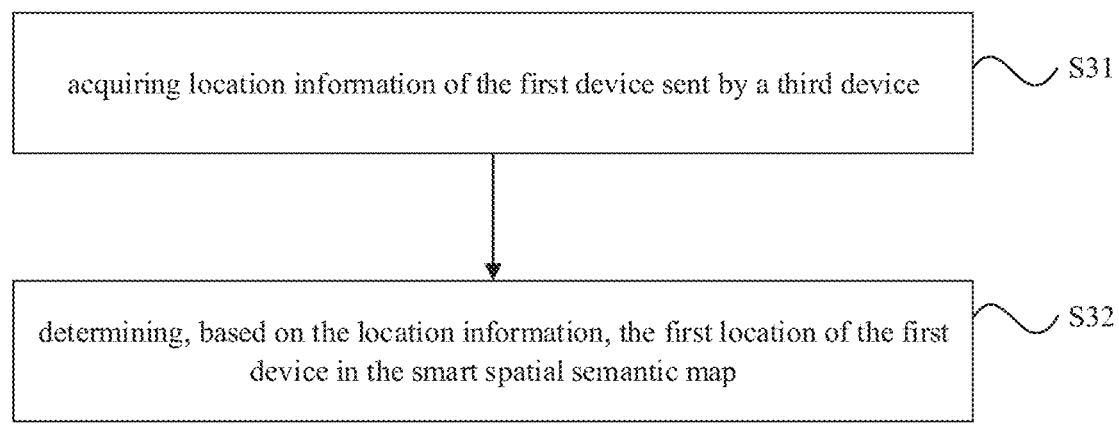
FIG. 4 is a flowchart showing a method for determining a first location based on a third device in a smart space semantic map according to some embodiments.

FIG. 4 is a flowchart showing a method for determining a first location based on a third device in a smart space semantic map according to some embodiments.

In step S31, location information of the first device sent by a third device is acquired.

In some embodiments of the present disclosure, the third device may determine location information in response to receiving a location determining instruction triggered at the location of the first device, and the location information is sent to the first device. The first device receives the location information sent by the third device. The location determining instruction that triggers the third device to determine the location information at the location of the first device may include a voice instruction and/or a microwave instruction. For example, the location determining instruction may be playback sound of music, video, etc. played on the first device, or the location determining instruction may also be a voice control instruction issued by a user using the first device, or a sound wave signal emitted by the first device, or the microwave signal emitted by the first device.

In some embodiments of the present disclosure, the location information determined by the third device may be time stamp information of receiving the location determining instruction.

In step S32, the first location of the first device in the smart space semantic map is determined based on the location information.

When the first location of the first device in the smart space semantic map is determined based on the location information in some embodiments of the present disclosure, the first location of the first device in the smart space semantic map may be determined based on the speed of sound and the propagation timestamp, or the propagation speed of the microwave and the timestamp.

In some embodiments of the present disclosure, the first location of the first device in the smart space semantic map can be determined through the above-mentioned visual information, acoustic information, and microwave information, and then the second location that needs to perform function control can be further determined based on the first location.

Figure 5:
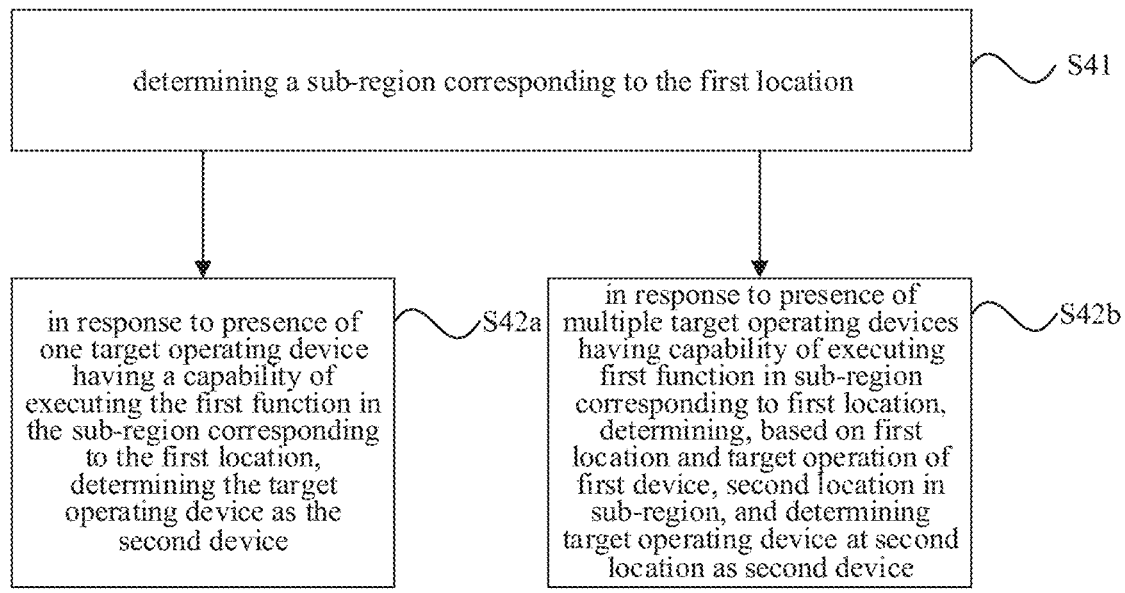
FIG. 5 is a flowchart showing a method for determining a second device based on a first location in a smart space semantic map according to some embodiments.

FIG. 5 is a flowchart showing a method for determining a second device based on a first location in a smart space semantic map according to some embodiments.

In step S41, a sub-region corresponding to the first location is determined.

In some embodiments of the present disclosure, the smart space semantic map includes sub-regions for distinguishing multiple different spatial locations, thus, when determining the sub-regions corresponding to the first location, on the one hand, the sub-region to which the first location belongs can be determined as the sub-region corresponding to the first location, and on the other hand, other sub-regions different from the sub-region to which the first location belongs may also be determined as the sub-region corresponding to the first location.

Figure 6:
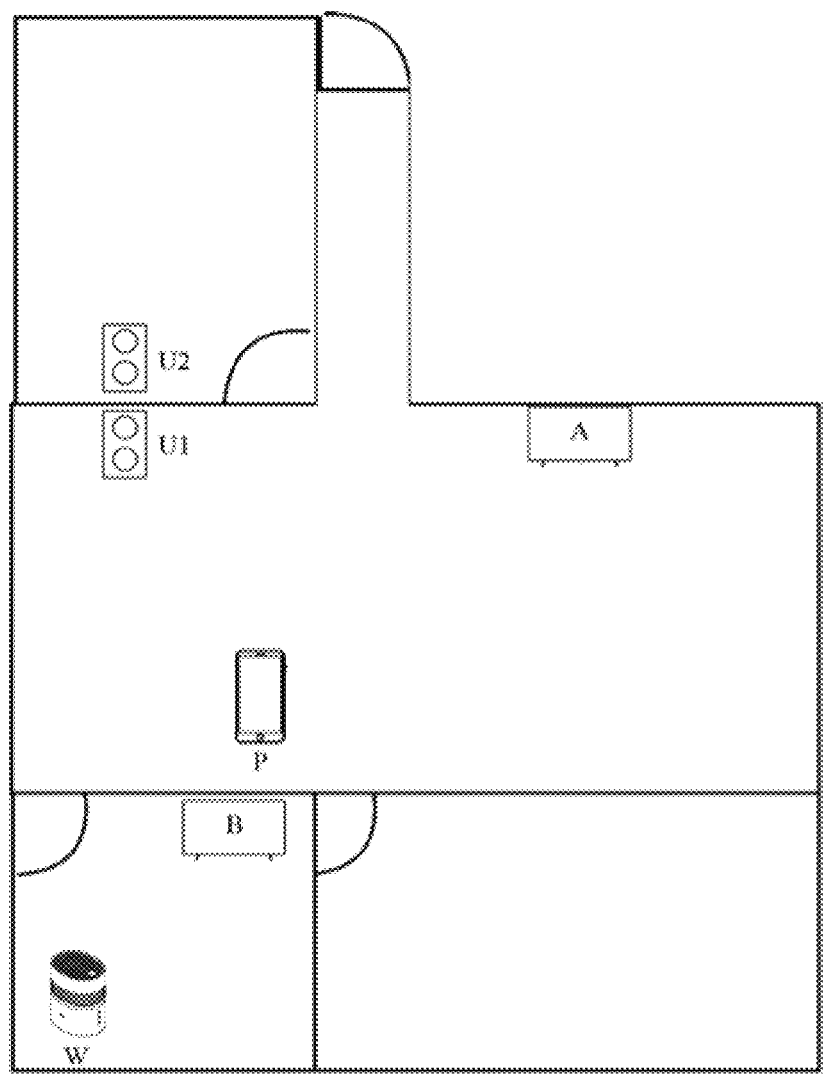
FIG. 6 is a schematic diagram showing a scenario of a function control method for determining a sub-region based on a first location according to some embodiments.

In an example, in some embodiments of the present disclosure, when the first device determines that there is a second device that needs to be controlled in the sub-region corresponding to the first location, the sub-region to which the first location belongs can be directly determined as the sub-region corresponding to the first location. In some embodiments of the present disclosure, when the first device determines that there is no second device that needs to be controlled in the sub-region corresponding to the first location, other sub-regions different from the sub-region to which the first location belongs may be determined as the sub-region to which first location corresponds. For example, as shown in FIG. 6, if the first device needs to execute a humidification function, the room region where the humidifier W is located can be selected as the sub-region corresponding to the first location. If the first device needs to execute the function of playing music, the room region where the speaker U1 and the speaker U2 are located can be selected as the sub-region corresponding to the first location.

In step S42a, in response to the presence of one target operating device having the capability of executing the first function in the sub-region corresponding to the first location, the target operating device is determined as the second device.

Figure 7:
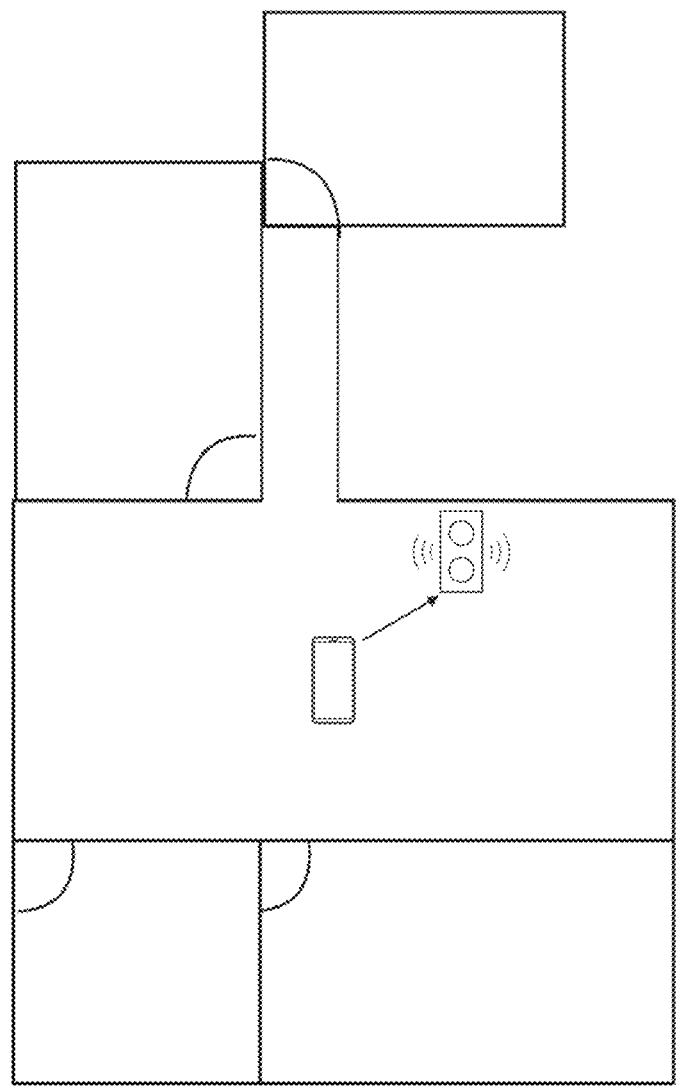
FIG. 7 is a schematic diagram showing a scenario of a function control method based on presence of a single device in a region according to some embodiments.

In some embodiments of the present disclosure, in response to presence of a target operating device capable of executing the first function in the corresponding sub-region of the first location, the target operating device is used as the second device. For example, as shown in FIG. 7, when the terminal in the living room needs to execute the function of playing music and there is only one speaker in the living room, the speaker in the living room is directly determined as the second device to play music.

In step S42b, in response to the presence of multiple target operating devices having the capability of executing the first function in the sub-region corresponding to the first location, a second location in the sub-region is determined based on the first location and a target operation of the first device, and a target operating device at the second location is determined as the second device.

In some embodiments of the present disclosure, when determining the second device, the granularity of the location may be determined based on the functional operation that needs to be executed and the device that needs to be controlled.

Figure 8:
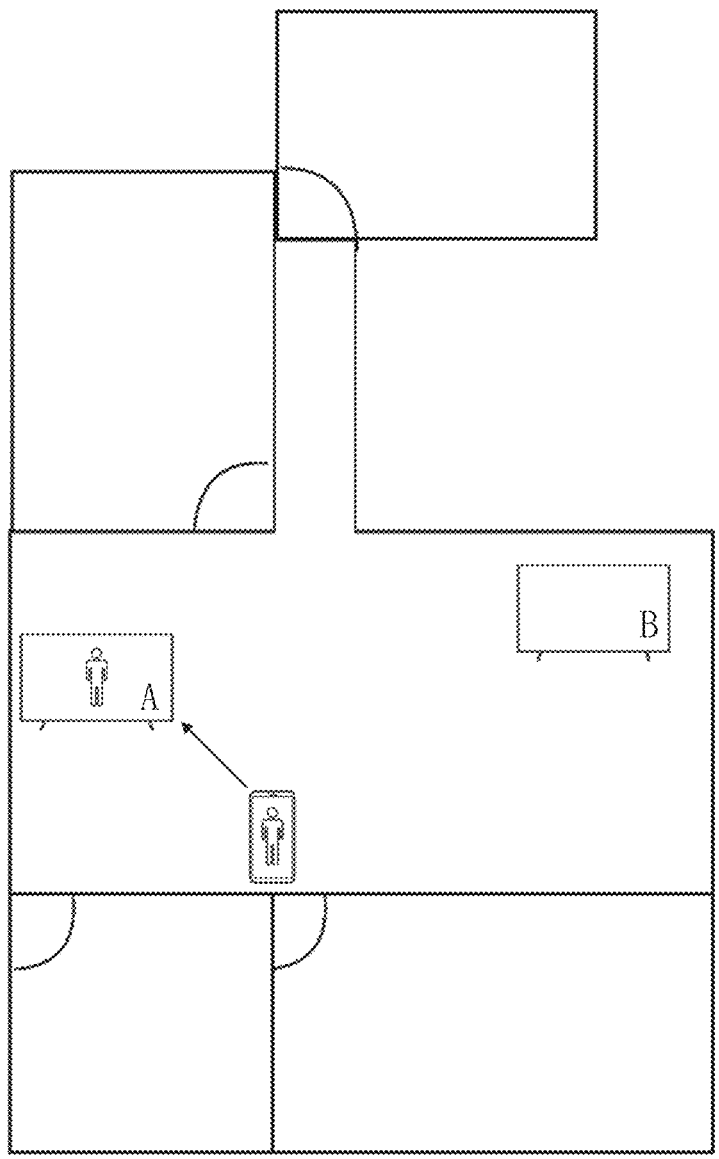
FIG. 8 is a schematic diagram showing a scenario of a function control method based on presence of multiple devices in a region according to some embodiments.

In an example, if there are multiple target operating devices in the current region, and the first device only needs to determine one second device, the unique second device can be determined by narrowing the sub-region corresponding to the first location. For example, as shown in FIG. 8, when the terminal in the living room needs to execute the screen projection function, and there are two TVs A and B in the living room, TV B being closer to the first device can be determined from TV A and TV B as the second device for projection by narrowing the sub-regions.

In some embodiments of the present disclosure, when determining the second device for control, the second location may be determined in the sub-region based on the first location and the target operation of the first device.

Figure 9:
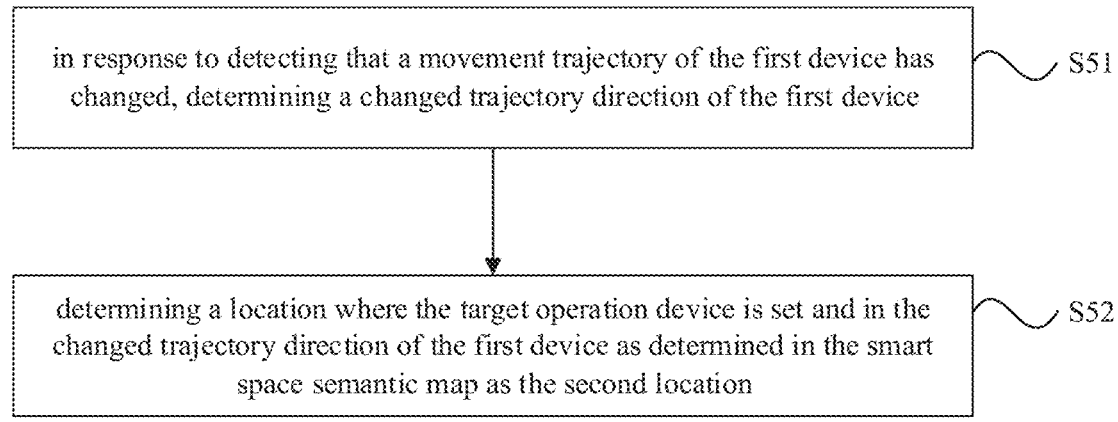
FIG. 9 is a flowchart showing a method for determining a second location in a smart space semantic map based on a movement trajectory of a first device according to some embodiments.

FIG. 9 is a flowchart showing a method for determining a second location in a smart space semantic map based on a movement trajectory of a first device according to some embodiments.

In step S51, in response to detecting that a movement trajectory of the first device has changed, a changed trajectory direction of the first device is determined.

In step S52, the location where the target operation device is set and in the changed trajectory direction of the first device as determined in the smart space semantic map is determined as the second location.

In some embodiments, the change in the trajectory of the first device may include an operation of the first device pointing to the target operating device. When the operation of the first device pointing to the target operating device is detected, the orientation of the first device relative to the location of the first device on the pre-established map after orientation change can be determined. In an example, the first device is currently located three meters southwest of the second device, and the first device is waved along the southwest direction at the current location to point to the target operating device. Combining the location of the second device on the smart space semantic map and the location relationship information of respective devices in the smart space semantic map, the second device can determine the target operating device at the location of the orientation corresponding to the location in the smart space semantic map.

In another embodiment, the change in the trajectory of the first device may also include an operation of the first device being moved and approaching the target operating device. In an example, when it is detected that the first device is moved and approached to the target operation, the orientation of the first device relative to the location of the first device in the pre-established map after orientation change can be determined. In an example, the first device is currently located three meters southwest of the second device, and the first device is carried by the user to approach to the target operating device along the southwest direction at the current location. In the application process, the target operation device can be determined by combining the location of the second device in the smart space semantic map and the target operation of the first device.

In the function control method provided by some embodiments of the present disclosure, when determining the second device, on the one hand, in the case of rough granularity, such as projecting to the only TV in the living room, the second device (TV) that the user intends to control can be determined directly through the user's current general location information (the living room to which the first location corresponds). On the other hand, when the granularity requirement is relatively high, when the user device points to the device that is to be connected to, it also needs to track the movement trajectory of the user device (for example, sensors such as gyroscopes etc.). For example, in FIG. 10, the first location of the user's first device is the location P2 in the living room, it is determined that there are multiple second devices in the living room (represented by the circle in the figure), and then the user's pointing direction A can be known through movement of the user. Through the location P2 and the pointing direction A, the second device that the user intends to control can be determined, and the device that the user is trying to control can be retrieved from the smart space semantic map.

Further, the number of the second device executing the first function in some embodiments of the present disclosure may be one or multiple.

In some possible implementations, if only one second device is required to execute the first function, the unique second device can be determined. For example, as shown in FIG. 7, when the mobile phone needs to execute the function of playing music, a speaker is determined to play audio.

Figure 11:
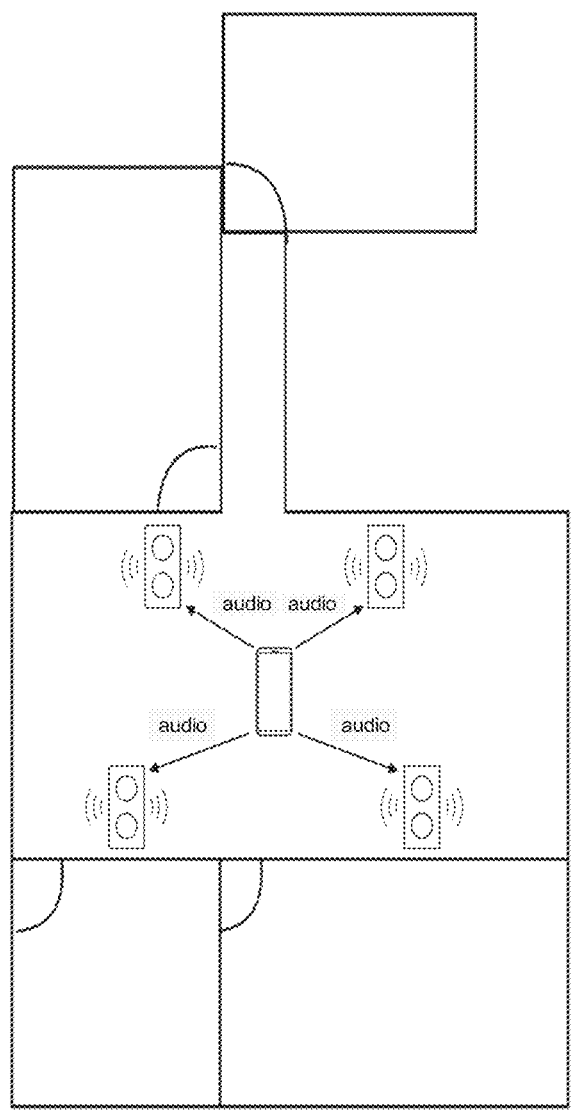
FIG. 11 is a schematic diagram showing a scenario of a function control method based on having multiple devices in a region according to some embodiments.

In another example, when the first function to be executed requires multiple second devices, multiple second devices can be determined to jointly execute the first function. For example, as shown in FIG. 11, when the mobile phone needs to execute the function of playing music, four speakers can be controlled concurrently to play music.

Figure 12:
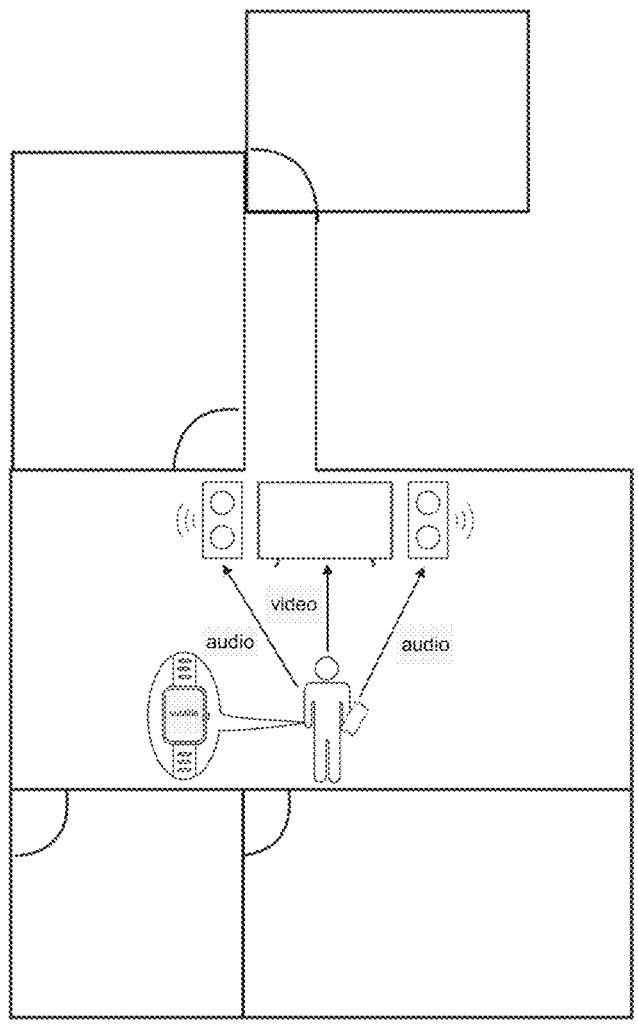
FIG. 12 is a schematic diagram showing another scenario of a function control method based on having multiple devices in a region according to some embodiments.

In another example, when multiple second devices are required to execute the first function, multiple second devices may execute the same function. As shown in FIG. 11, four speakers play music together. When the executed first function requires multiple second devices, the multiple second devices may execute multiple different functions. For example, as shown in FIG. 12, the TV is equipped with components that can play audio, and there are two other external speakers in the region. In an implementation of embodiments of the present disclosure, when the mobile phone needs to execute a video playback function, it can control the TV to play images and audio at the same time. It can also control the TV to play images and control the external speakers to play audio when the mobile phone needs to execute the video playback function. When multiple first functions need to be executed, multiple second devices may be determined to execute the first function. For example, when the mobile phone needs to execute the "K song" function, the TV is controlled to play pictures, the smart watch is controlled to play lyrics and subtitles, and the external speakers are controlled to play audio.

Based on the same inventive concept, the present disclosure further provides a function control apparatus.

It may be understood that, in order to achieve the above functions, the function control apparatus provided by some embodiments of the present disclosure includes a hardware structure and/or a software module corresponding to each function. With reference to the units and algorithm steps of each example disclosed in some embodiments of the present disclosure, some embodiments of the present disclosure may be implemented in the form of hardware or a combination of hardware and computer software. Whether a certain function is performed by hardware or computer software-driven hardware depends on the specific application and design constraints of the technical solutions. Those skilled in the art may use different methods to implement the described functions for each specific application, but such implementation should not be considered to go beyond the scope of the technical solutions of the embodiments of the present disclosure.

Figure 13:
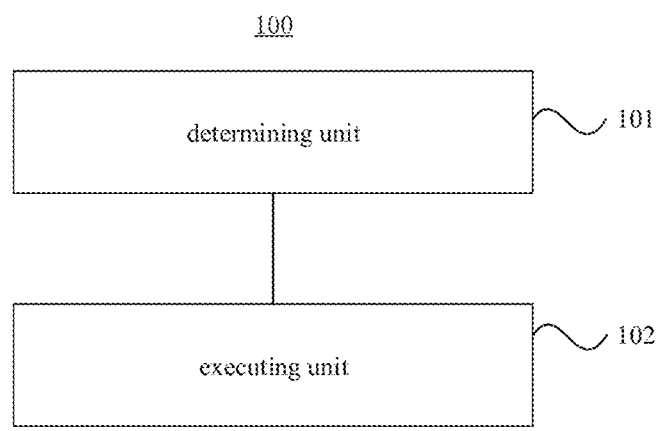
FIG. 13 is a block diagram showing a function control apparatus according to some embodiments.

FIG. 13 is a block diagram showing a function control apparatus according to some embodiments. Referring to FIG. 13, the device 100 includes a determining unit 101 and an executing unit 102.

The determining unit 101 is configured to determine a first location of the first device in the smart space semantic map, and determine, based on the first location, a second device in the smart space semantic map, and the second device has a capability of executing a first function. The executing unit 102 is configured to perform a predetermined action, and to cause the second device to execute the first function.

In an implementation, the first device pre-stores multiple sample images representing different region locations in the smart space semantic map, the determining unit 101 determines a first location of the first device in the smart space semantic map by adopting the following manner:

acquiring a first image; determining a first sample image from among multiple pre-stored sample images, features of the first sample image matching features of the first image; determining, based on a region location represented by the first sample image, a first location of the first device in the smart space semantic map.

In an implementation, the determining unit 101 determines, based on a region location represented by the first sample image, a first location of the first device in the smart space semantic map by adopting the following manner:
in response to that the region location represented by the first sample image is one, determining the region location represented by the first sample image as the first location of the first device in the smart space semantic map; in response to that there are multiple region locations represented by the first sample image, acquiring a second image; and determining a second sample image from multiple pre-stored sample images, and determining, based on a region location represented by the second sample image, the first location of the first device in the smart space semantic map, features of the second sample image match features of the second image, and the second sample image is different from the first sample image.

In an implementation, the determining unit 101 determines a first location of the first device in the smart space semantic map by adopting the following manner:
acquiring location information of the first device sent by a third device, in which the location information is determined by the third device in response to receipt of a location determining instruction triggered at the location of the first device, and the location determining instruction includes a voice instruction and/or a microwave instruction; and determining, the first location of the first device in the smart space semantic map based on the location information.

In an implementation, the smart space semantic map includes sub-regions for distinguishing multiple different spatial locations; the determining unit 101 determines, based on the first location, the second device in the smart space semantic map by adopting the following manner:
determining a sub-region corresponding to the first location; and in response to presence of one target operating device having the capability of executing the first function in the sub-region corresponding to the first location, determining the target operating device as the second device.

In an implementation, the smart space semantic map includes sub-regions for distinguishing multiple different spatial locations; the determining unit 101 determines, based on the first location, the second device in the smart space semantic map by adopting the following manner:
determining a sub-region corresponding to the first location; in response to presence of multiple target operating devices having the capability of executing the first function in the sub-region corresponding to the first location, determining, based on the first location and a target operation of the first device, a second location in the sub-region, and determining a target operating device at the second location as the second device.

In an implementation, the target operation includes a change in a motion trajectory, the determining unit 101 determines, based on the first location and a target operation of the first device, a second location in the sub-region, by adopting the following manner: in response to detecting that a movement trajectory of the first device has changed, determining a changed trajectory direction of the first device; and determining a location where the target operation device is set and in the changed trajectory direction of the first device as determined in the smart space semantic map as the second location.

In an implementation, the smart space semantic map includes sub-regions for distinguishing multiple different spatial locations; the determining unit 101 determines a sub-region corresponding to the first location by adopting the following manner: determining a sub-region to which the first location belongs as a sub-region corresponding to the first location, and/or determining other sub-regions that are different from the sub-region to which the first location belongs as sub-regions corresponding to the first location.

With respect to the device in the above embodiments, the specific manners for performing operations for individual modules therein have been described in detail in the embodiments regarding the methods, which will not be elaborated herein.

Figure 14:
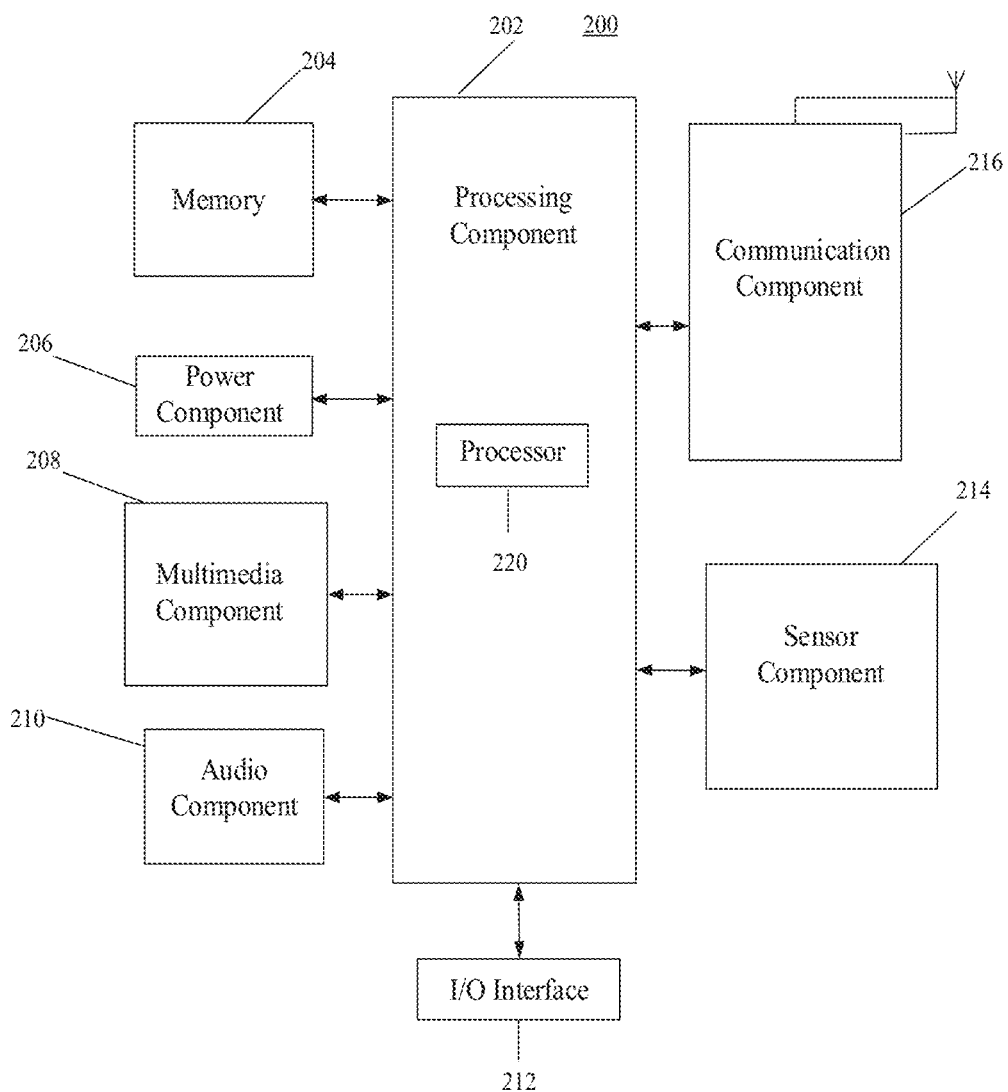
FIG. 14 is a block diagram showing an apparatus for controlling functions according to some embodiments.

FIG. 14 is a block diagram of an apparatus 200 for controlling functions according to some embodiments. For example, the apparatus 200 may be a mobile phone, a computer, a digital broadcast terminal, a messaging device, a gaming console, a tablet, a medical device, exercise equipment, a personal digital assistant, etc.

Referring to FIG. 14, the apparatus 200 can include one or more of the following components: a processing component 202, a memory device 204, a power component 206, a multimedia component 202, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the selection between the processing component 202 and other components. For instance, the processing component 202 can include a multimedia module to facilitate the selection between the multimedia component 202 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 can include a power management system, one or more power sources, and any other components associated with the generation, management, and distribution of power in the apparatus 200.

The multimedia component 208 includes a screen providing an output interface between the apparatus 200 and the user. In some embodiments, the screen can include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the apparatus 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone ("MIC") configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, the peripheral interface modules may be a keyboard, a click wheel, buttons, etc. The buttons can include, but are not limited to, a home button, a volume button, a starting button, and a locking button.

The sensor component 214 includes one or more sensors to provide status assessments of various aspects of the apparatus 200. For instance, the sensor component 214 can detect an open/closed status of the apparatus 200, relative selection of components, e.g., the display and the keypad, of the apparatus 200, a change in location of the apparatus 200 or a component of the apparatus 200, a presence or absence of user contact with the apparatus 200, an orientation or an acceleration/deceleration of the apparatus 200, and a change in temperature of the apparatus 200. The sensor component 214 can include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as Wi-Fi, 2G, 3G, 4G or 5G, and a combination thereof. In some embodiments, the communication component 216 receives a broadcast signal or broadcast associated information from an external broadcast management system via a broadcast channel. In some embodiments, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer readable storage medium including instructions is provided, such as included in the memory 204, executable by the processor 220 in the apparatus 200, for performing the above-described methods. For example, the non-transitory computer-readable storage medium may be a ROM, a RAM, a CD-ROM, a magnetic tape, a floppy disc, an optical data storage device, etc.

Various embodiments of the present disclosure can have the following advantages.

A first location of the first device in the smart space semantic map is determined; based on the first location, a second device in the smart space semantic map is determined, and the second device has the capability of executing a first function; and a predetermined action is performed so the second device will execute the first function. Therefore, the control over the function operating device can be determined based on the smart space semantic map, smart interaction between devices can be realized, and better function control effect can be achieved.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A function control method, applied to a first device configured with a smart space semantic map, the method comprising:
    determining a first location of the first device in the smart space semantic map;
    determining, based on the first location, a second device in the smart space semantic map, the second device having a capability of executing a first function; and
    performing a predetermined action, to cause the second device to execute the first function,
    wherein multiple sample images representing different region locations in the smart space semantic map are stored in advance in the first device; and
    said determining a first location of the first device in the smart space semantic map comprises:
    acquiring a first image;
    determining a first sample image from among multiple pre-stored sample images, features of the first sample image matching features of the first image; and
    determining, based on a region location represented by the first sample image, a first location of the first device in the smart space semantic map by:
    in response to that the region location represented by the first sample image is one, determining the region location represented by the first sample image as the first location of the first device in the smart space semantic map;
    in response to that the region location represented by the first sample image is multiple, acquiring a second image, and
    determining a second sample image from among multiple pre-stored sample images, and determining, based on a region location represented by the second sample image, the first location of the first device in the smart space semantic map, features of the second sample image matching features of the second image, and the second sample image being different from the first sample image.

2. The function control method according to claim 1, wherein said determining a first location of the first device in the smart space semantic map comprises:

acquiring location information of the first device sent by a third device, the location information being determined by the third device in response to receipt of a location determining instruction triggered at the location of the first device, and the location determining instruction comprising a voice instruction and/or a microwave instruction; and determining, based on the location information, the first location of the first device in the smart space semantic map.

3. The function control method according to claim 1, wherein the smart space semantic map comprises sub-regions for distinguishing multiple different spatial locations; and said determining, based on the first location, the second device in the smart space semantic map comprises:

determining a sub-region corresponding to the first location; and in response to presence of one target operating device having a capability of executing the first function in the sub-region corresponding to the first location, determining the target operating device as the second device.

4. The function control method according to claim 3, wherein the smart space semantic map comprises sub-regions for distinguishing multiple different spatial locations; and said determining a sub-region corresponding to the first location comprises:

determining a sub-region to which the first location belongs as a sub-region corresponding to the first location, and/or determining other sub-regions that are different from the sub-region to which the first location belongs as sub-regions corresponding to the first location.

5. The function control method according to claim 1, wherein the smart space semantic map comprises sub-regions for distinguishing multiple different spatial locations; and said determining, based on the first location, the second device in the smart space semantic map comprises:

determining a sub-region corresponding to the first location; and in response to presence of multiple target operating devices having a capability of executing the first function in the sub-region corresponding to the first location, determining, based on the first location and a target operation of the first device, a second location in the sub-region, and determining a target operating device at the second location as the second device.

6. The function control method according to claim 5, wherein the target operation comprises a change in a motion trajectory; and said determining, based on the first location and a target operation of the first device, a second location in the sub-region comprises:

in response to detecting that a movement trajectory of the first device has changed, determining a changed trajectory direction of the first device; and determining a location where the target operation device is set and in the changed trajectory direction of the first device as determined in the smart space semantic map as the second location.

7. A function control apparatus, applied to a first device configured with a smart space semantic map, the apparatus comprising:

a memory device configured to store processor-executable instructions;

a processor configured to:

determine a first location of the first device in the smart space semantic map, and determine, based on the first location, a second device in the smart space semantic map, the second device having a capability of executing a first function; and perform a predetermined action, to cause the second device to execute the first function, wherein the first device pre-stores multiple sample images representing different region locations in the smart space semantic map; and the processor is further configured to determine a first location of the first device in the smart space semantic map by:

acquiring a first image;

determining a first sample image from among multiple pre-stored sample images, features of the first sample image matching features of the first image; and determining, based on a region location represented by the first sample image, a first location of the first device in the smart space semantic map by:

in response to that the region location represented by the first sample image is one, determining the region location represented by the first sample image as the first location of the first device in the smart space semantic map;

in response to that the region location represented by the first sample image is multiple, acquiring a second image, and determining a second sample image from among multiple pre-stored sample images, and determining, based on a region location represented by the second sample image, the first location of the first device in the smart space semantic map, features of the second sample image matching features of the second image, and the second sample image being different from the first sample image.

8. The function control apparatus according to claim 7, wherein the processor is further configured to determine a first location of the first device in the smart space semantic map by:

acquiring location information of the first device sent by a third device, the location information being determined by the third device in response to receipt of a location determining instruction triggered at the location of the first device, and the location determining instruction comprising a voice instruction and/or a microwave instruction; and determining, based on the location information, the first location of the first device in the smart space semantic map.

9. The function control apparatus according to claim 7, wherein the smart space semantic map comprises sub-regions for distinguishing multiple different spatial locations; and the processor is further configured to determine, based on the first location, the second device in the smart space semantic map by:

determining a sub-region corresponding to the first location; and in response to presence of one target operating device having a capability of executing the first function in the sub-region corresponding to the first location, determining the target operating device as the second device.

10. The function control apparatus according to claim 9, wherein
the smart space semantic map comprises sub-regions for distinguishing multiple different spatial locations; and
the processor is further configured to determine a sub-region corresponding to the first location by:
determining a sub-region to which the first location belongs as a sub-region corresponding to the first location, and/or determining other sub-regions that are different from the sub-region to which the first location belongs as sub-regions corresponding to the first location.

11. The function control apparatus according to claim 7, wherein
the smart space semantic map comprises sub-regions for distinguishing multiple different spatial locations; and
the processor is further configured to determine, based on the first location, the second device in the smart space semantic map by:
determining a sub-region corresponding to the first location; and
in response to presence of multiple target operating devices having a capability of executing the first function in the sub-region corresponding to the first location, determining, based on the first location and a target operation of the first device, a second location in the sub-region, and determining a target operating device at the second location as the second device.

12. The function control apparatus according to claim 11, wherein
the target operation comprises a change in a motion trajectory; and
the processor is configured to determine, based on the first location and a target operation of the first device, a second location in the sub-region by:
in response to detecting that a movement trajectory of the first device has changed, determining a changed trajectory direction of the first device; and
determining a location where the target operation device is set and in the changed trajectory direction of the first device as determined in the smart space semantic map as the second location.

13. A non-transitory computer-readable storage medium, when the instructions in the storage medium are executed by a processor of a mobile terminal, enabling the mobile terminal to implement the function control method according to claim 1.

14. The non-transitory computer-readable storage medium according to claim 13, wherein said determining a first location of the first device in the smart space semantic map comprises:
acquiring location information of the first device sent by a third device, the location information being determined by the third device in response to receipt of a location determining instruction triggered at the location of the first device, and the location determining instruction comprising a voice instruction and/or a microwave instruction; and
determining, based on the location information, the first location of the first device in the smart space semantic map.

\* \* \* \* \*